United States Patent Office
3,207,716
Patented Sept. 21, 1965

3,207,716
STRIPPABLE COATING COMPRISING ETHYLENE-VINYL ACETATE COPOLYMERS AND RELEASE AGENT
Richard F. Lippoldt, Ponca City, Okla., assignor to Continental Oil Company, Ponca City, Okla., a corporation of Delaware
No Drawing. Filed Sept. 4, 1962, Ser. No. 221,352
10 Claims. (Cl. 260—23)

This invention relates to protective coating compositions, and particularly to such compositions comprising homogeneous admixtures of a paraffin wax and a thermoplastic polymer suitable for forming temporary strippable coatings on metallic surfaces, especially those of iron, steel and aluminum objects.

Heretofore, both waxes and thermoplastic polymers have by themselves been employed in coating compositions of the type to which this invention broadly relates. Waxes, and particularly paraffin wax, possess certain excellent properties which render them adaptable for use in coating compositions for the temporary protection of metallic surfaces. Perhaps the outstanding beneficial property of a paraffin wax for use in an application of this type resides in its ability to thwart corrosion inducing factors such as exposure to atmospheric moisture and acidic fumes, contact and corrosive fluids and the like. In contrast to their relative chemical inertness, waxes exhibit a number of decided disadvantages when used as a temporary protective coating for metal surfaces. For one, wax coatings are extremely difficult to remove from metallic surfaces to which they are applied and generally necessitate pretreatment of the metallic surface with substances capable of reducing the adhesion between the wax and the metallic surface. The more effective of these adhesion reducing materials, e.g., silicones, fluorinated materials, etc. are extremely difficult to remove completely and even trace amounts thereof retained on the metal surface adversely effect the adhesion of any permanent type of protective coating subsequently applied thereto. Also, waxes possess notoriously poor abrasion resistant properties and, consequently, metallic objects coated in this manner require careful handling so as to avoid rupturing of the film.

Thermoplastic resins for the most part have properties complementing those of the waxes. Thus, their principal advantage in uses of the type herein concerned is that they are capable of forming a strong film having exceptionally good abrasion resistant properties. The disadvantages associated with the use of thermoplastic polymers for temporary protective coatings are their comparatively high cost and the difficulty experienced in applying them as films to various surfaces. Generally, the prior art resin based coatings must be applied in form of a solution thereof in expensive organic solvents which cannot be conveniently recovered during the coating operation.

Compositions composed predominantly of admixtures of a paraffin wax and a thermoplastic polymer, particularly the polyolefins, e.g., polyethylene, have been often suggested as coating compositions. However, such compositions have found their principal usefulness in paper substrate coatings where the main objective in including a resinous component is to improve certain notorious deficiencies of the wax component, namely, lack of tensile strength, hardness and the like. Nevertheless, none of these prior art coating compositions wherein a synthetic resin and wax constitute the main ingredients exhibits the required degree of cohesiveness necessary in order to obtain a suitable strippable film.

It is an object of this invention to provide improved protective coating compositions for metallic surfaces which can be easily applied thereto.

A further object of the present invention is to utilize paraffin wax in temporary protective coatings for metallic surfaces in a manner whereby the deficiencies associated with the use of wax alone in such an application are substantially completely obviated.

Another object is to prepare coating compositions of the type hereinabove described which are regenerable in character, that is, after serving their purpose, they can be recovered and readily reapplied in another coating operation.

These and still further objects of this invention will be better understood by those skilled in the art upon consideration of the detailed description and examples given hereinbelow.

The compositions of this invention in addition to the wax and resin components contain a small but effective amount of what is termed a release agent. The release agent adjuvants contemplated herein do not significantly affect the various beneficial properties of the pellicle formed therefrom such as, for example, cohesion, sensitivity to moisture, chemical inertness, etc. if the practices taught herein are observed. The release agent, even though homogeneously dispersed throughout the composition, nevertheless effectively reduces to a tolerable minimum the adhesion between the film and the metallic surface to which it is applied. More details as to the materials which serve as satisfactory release agents in the compositions of this invention wall be given hereinbelow.

Although a variety of waxes can be employed in the compositions of this invention, the paraffin waxes are preferred. Paraffin waxes are the waxy constituents occurring in various fractions of most crude petroleum. They manifest melting points in a range of about 47 to 65° C. and Saybolt viscosities in the range of from about 35 to 45 S.U. at 210° F., and are further physically characterized by crystallizing into large, well-formed distinct crystals of the plate and needle types. The physical characteristics of a paraffin wax may vary as indicated depending upon the crude source, the portion of the crude used for wax production and differences in refining techniques. In order to illustrate further the various types of waxes that can be utilized in this invention, a brief description will be given of the procedure employed in the manufacture of paraffin wax.

The customary fractionation of crude petroleum stocks yields light fractions or cuts comparatively rich in wax components which are termed paraffin or wax distillates. These paraffin rich fractions are normally liquid at elevated temperature and upon cooling to lower temperatures, the wax content readily precipitates. After satisfactorily cooling a wax distillate, the precipitate is recovered by a filtering process in a form of slack wax. Slack wax normally contains from 20–40% oil content. Next, the slack wax is sweated, which operation merely consists of heat treating the slack wax whereby the oil drains from or sweats out of the solid wax as the temperature is slowly raised. The sweating operation yields a crude scale wax containing about 2% oil. Fully refined paraffin wax is then obtained by merely further sweating the crude scale wax to a specific melting point range followed by treatment with a suitable adsorbent. The fully refined product usually contains less than 0.5 wt. percent of oil.

The use of the fully refined type of paraffin wax is not mandatory in the coating compositions of this invention. Thus, scale wax or mixtures of the refined wax with either slack wax or scale wax can be employed. Additionally, waxes of animal or vegetable origin can be employed in combination with the paraffin wax. Also, microcrystalline waxes can be used. Accordingly, in the subsequent discussion, the term paraffin wax will be employed in contemplation of various waxes and combinations thereof mentioned above.

The resinous component of the compositions of this invention is limited to a particular type of polymer, more specifically, a copolymer of ethylene and vinyl acetate. Only this type of polymer can be admixed with the paraffin wax to yield compositions which provide coatings or films having the necessary strength properties for use as strippable pellicles. More particularly, the ethylene-vinyl acetate copolymers suitable for the implementation of this invention are those polymers having a polymerized vinyl acetate content of from about 10–40% by weight and, more preferably, from about 25–35% by weight.

These copolymers can be conveniently prepared by copolymerizing a mixture of ethylene and vinyl acetate in the presence of a free-radical catalyst, e.g., tertiary butyl hydroperoxide, in a suitable reactor at a pressure of from about 15,000 to 30,000 p.s.i. and a temperature from about 150–250° C. By varying one or several of the reaction conditions enumerated, various molecular weight polymers can be obtained. Ordinarily in this art, the molecular weight of the resultant copolymer is generally not expressed as such because of the difficulty and uncertainty of reliably ascertaining this property. Accordingly, an alternate and the preferred manner of specifying the molecular weight characteristics of such copolymers is in terms of the polymer's melt index as determined by A.S.T.M. D–1238–57 T. Briefly stated, this test consists of determining the amount in grams (melt index value) of the copolymer that can be pressed through a standard orifice in ten minutes at 190° C. with a piston weighing 2160 grams. The ethylene-vinyl acetate copolymers especially useful herein exhibit melt indices ranging between about 3 and 300 and more preferably, between about 3 and 30.

To prepare the compositions of this invention, from about 80–30 parts of the paraffin wax and correspondingly from about 20–70 parts of the ethylene-vinyl acetate copolymer are suitably admixed to give a substantially uniform dispersion. Such compounding can be most conveniently observed by heating the paraffin wax to an elevated temperature, for example, above about 120° C. and adding the copolymer in a comparatively finely divided state thereto with mixing. For the majority of the applications in which the instant compositions are useful, it is preferred to employ a wax-copolymer combination within the ratio range of 70:30, respectively, to 50:50, respectively. The choice of the particular composition to be employed will depend upon its end use. For example, when it is desired to prepare a film having a high degree of strength, it would then be desirable to employ the higher amounts of the copolymer indicated. On the other hand, if a film is desired which will not be subjected to an unusual amount of handling or contact with other objects, then it would be economically advantageous to use a wax-copolymer combination wherein the wax content materially predominates.

As indicated previously, the compositions of this invention include a minor amount of a release agent. Suitable release agents can be broadly defined as the partial polyhydric alcohol esters of fatty acids having from 6–22 carbon atoms or acetylated derivatives thereof. The esterifying fatty acid can either be saturated or unsaturated. The preferred acids are those which are naturally derived, such as, for example, lauric, myristic, palmitic, stearic, oleic, linoleic, ricinoleic, tall oil fatty acids and the like. Other suitable mono-basic acids include caprylic, pelargonic, capric, hendecanoic, tridecanoic, pentadecanoic, margaric, nonadecanoic, etc. The partial esters can be readily obtained by esterifying a polyhydric alcohol with a deficiency of fatty acids. Also, the naturally occurring glycerides, e.g., coconut oil, castor oil, soya oil, etc., can be transesterified with glyceryl or other alcohols to yield suitable partial esters.

The alcohol moiety of the partial ester can be either a glycol, trihydric alcohol, terahydric alcohol or an alcohol having in excess of 4 hydroxyl groups or mixtures thereof. In the case of the esters of glycol, one hydroxyl or acetylated hydroxyl group should be present in the partial ester. As regards the higher functional alcohols, one or more of the hydroxyl groups of the alcohol can be esterified; however, the ester should contain at least one hydroxyl group, either free or acetylated. With the foregoing in mind, an enumeration of applicable alcohols include the alkane diols, e.g., ethylene glycol, diethylene glycol, propylene glycol, dipropylene glycol, trimethylene glycol, tetramethylene glycol, butanediol-1,2-pentanediol-1,4, hexanediol-1,6, pinacol, etc. Among applicable trihydric alcohols there are: glycerol, trimethylol ethane, trimethylol propane and the like. Of these trihydric alcohols, glycerol is especially preferred. Pentaerythritol represents a suitable tetrahydric alcohol. Examples of higher functional alcohols are dipentaerythritol, sorbitol, mannitol, arabitol, xylitol, dulcitol and the like.

A specific enumeration of partial esters suitable as release agents in the composition of this application are such as glyceryl monolaurate, glyceryl dilaurate, glyceryl monostearate, glyceryl monopalmitate, trimethylol ethane monostearate, trimethylol ethane dioleate, trimethylol propane monopalmitate, trimethylol propane dicaproate, glyceryl monocaproate, pentaerythritol dioleate, pentaerythritol dilaurate, etc. Esterification products of one mole of the any of the hexols enumerated above with from 1–4 moles of saturated or unsaturated fatty acids having from 6–22 carbon atoms. Derivatives of the foregoing esters in which free hydroxyls are acetylated to some degree are such as glyceryl monolaurate mono- or diacetate, glyceryl dilaurate acetate, etc., or mixtures of these insofar as the degree of acetylation is concerned.

The amount of release agent that can be employed in the compositions of this invention is variable and ranges from about 2–12% based on the total weight of wax and copolymer present. The precise amount of the release agent which will effectively serve to reduce adhesion between the coating and the metallic surface depends upon a number of considerations. Among these there is the type of metal to which the composition is to be applied. In general, it has been found that both the aforementioned partial esters and acetylated derivatives thereof are equally suitable for satisfactorily reducing the adhesion between the applied coating and an aluminum surface; whereas, the partial esters are somewhat superior to their acetylated derivatives when the composition is employed to coat ferrometallic surfaces. Another factor governing the choice of amount of release agent is the nature of the agent employed. For example, the glyceryl mono esters are more effective than, for example, the partial esters of glycols and, consequently, between the two types, lesser quantities of the former will suffice. Another consideration arising in the selection of either the type of release agent or amount thereof, turns upon the strength requirements of the coating since these adjuvants do not, in general, contribute to this property. It warrants mentioning that amounts in excess of 12% generally do not significantly aid in the further reduction of adhesion between the coating and the metallic surface and hence from an economical standpoint, it is preferable that this amount not be exceeded. It also warrants mentioning here that the finding that the partial esters of the polyhydric alcohols and their acetylated derivatives serve as effective release agents was totally unexpected. Actually, upon considering the polar nature of these substances, one would normally expect that they would contribute to adhesion of the coating to the metallic surface rather than beneficially minimizing same.

The coating of the metallic surfaces with the compositions of this invention can be effected in one of several ways. The preferred manner of coating is by a dipping process wherein the article to be coated is submerged into a molten bath of the composition. The temperature at which the bath is maintained together with the rate at which the article is removed therefrom mainly determines the thickness of the resultant coating. The compositions can also be applied to the surface of the object to be protected by means of hot spraying. The thickness of the coating desired will obviously depend on a number of factors. Ordinarily, suitable protective thicknesses range from .001 to .100 inches.

The coating or film which covers the articles adheres only lightly and may be readily peeled off in large pieces or striped off in practically one piece depending on the contour of the surface of the article. Since the films or coatings derived from the compositions of this invention are generally strong and tough, it is customarily expedient first to split the film at some convenient spot and then proceed to peel or strip the coating from the article. As indicated, an important attribute of this invention is that subsequent to the use of the coatings in one application, they can be remelted and employed in a new composition as is or the ratio of components can be altered for the new application.

In order to illustrate further the nature of this invention, the following examples are given in which all parts are parts by weight unless otherwise indicated. These examples are, as mentioned, given primarily by way of illustration and, accordingly, any enumeration of details set forth therein is not to be construed as a limitation on the invention except as such are expressed in the appended claims.

*Example I*

A coating composition was prepared by blending a paraffin wax with an ethylene-vinyl acetate copolymer in the ratio of 60:40, respectively. The wax employed was fully refined and had an A.S.T.M. D 87 M.P. of 122–3° F. and an A.S.T.M. D 721 oil content less than 0.5%. The copolymer contained a polymerized vinyl acetate content of about 30% and exhibited a melt index of 12–18. The composition was prepared by heating the wax component to about 200° F. to which the copolymer in granulated form was slowly added with contant stirring. Stirring was carried out until complete homogeneity was obtained. Thereafter, to 95 parts of the heated wax-copolymer blend were added 5 parts of glyceryl monolaurate with agitation necessary to secure complete homogeneity of the mixture.

A molten bath of the above composition was maintained at about 200° F. To both the iron and aluminum coupons were applied coatings of the composition by means of a dipping process. The coated coupons of both metals were cooled and aged for a short period of time. All coatings were then easily removed from the metallic coupons by hand stripping.

*Example II*

A homogeneous wax-copolymer blend identical in composition with that of Example I was prepared in a similar manner. To 95 parts of such a blend were added 5 parts of a commercially available acetylated monoglyceride (Myvacet 5–00 [1]). The homogeneous mixture was then used to coat aluminum coupons by the hot dip process. The solid coating deposited upon the coupons was easily hand stripped from the metal surface.

I claim:

1. A composition for forming a temporary strippable protective coating on a metallic surface comprising a homogeneous admixture of from about 80 to 30 parts of paraffin wax and correspondingly from about 20 to 70 parts of an ethylene-vinyl acetate copolymer having a vinyl acetate content between about 10 and 40% by weight, said admixture further containing a small but effective amount of a homogeneously dispersed release agent selected from the group consisting of a partial polyhydric alcohol ester of a fatty acid having from 6 to 22 carbon atoms and acetylated derivatives thereof.

2. A composition for forming a temporary strippable protective coating on a metallic surface selected from the group consisting of an aluminum surface and a ferro-metallic surface comprising a homogeneous admixture of from about 70 to 50 parts of paraffin wax and correspondingly from about 30 to 50 parts of an ethylene-vinyl acetate copolymer having a vinyl acetate content between about 25 and 35% by weight, said admixture further containing from about 2 to 12% of a homogeneously dispersed release agent selected from the group consisting of a partial trihydric alcohol ester of a fatty acid having from 10 to 18 carbon atoms and acetylated derivatives thereof.

3. A composition for forming a temporary strippable protective coating on a metallic surface selected from the group consisting of an aluminum surface and a ferro-metallic surface comprising a homogeneous admixture of from about 70 to 50 parts of paraffin wax and correspondingly from about 30 to 50 parts of an ethylene-vinyl acetate copolymer having a vinyl acetate content between about 25 and 35% by weight, said admixture further containing from about 2 to 12% of a homogeneously dispersed release agent selected from the group consisting of a trihydric alcohol mono-ester of a fatty acid having from 10 to 18 carbon atoms and acetylated derivatives thereof.

4. A composition for forming a temporary strippable protective coating on a metallic surface selected from the group consisting of an aluminum surface and a ferro-metallic surface comprising a homogeneous admixture of from about 70 to 50 parts of paraffin wax and correspondingly from about 30 to 50 parts of an ethylene-vinyl acetate coplymer having a vinyl acetate content between about 25 and 35% by weight, said admixture further containing from about 2 to 12% of a homogeneously dispersed release agent selected from the group consisting of a glyceryl mono-ester of a fatty acid having from 10 to 18 carbon atoms and acetylated derivatives thereof.

5. A composition for forming a temporary strippable protective coating on a metallic surface selected from the group consisting of an aluminum surface and a ferro-metallic surface comprising a homogeneous admixture of from about 70 to 50 parts of paraffin wax and correspondingly from about 30 to 50 parts of an ethylene-vinyl acetate copolymer having a vinyl acetate content between about 25 and 35% by weight, said admixture further containing from about 2 to 12% of a homogeneously dispersed acetylated glyceryl mono-ester of a fatty acid having from 10 to 18 carbon atoms.

6. A composition for forming a temporary strippable protective coating on a metallic surface selected from the group consisting of an aluminum surface and a ferro-metallic surface comprising a homogeneous admixture of from about 70 to 50 parts of paraffin wax and correspondingly from about 30 to 50 parts of an ethylene-vinyl acetate copolymer having a vinyl acetate content between about 25 and 35% by weight, said admixture further containing from about 2 to 12% of a homogeneously dispersed glyceryl mono-ester of a fatty acid having from 10 to 18 carbon atoms.

7. A composition for forming a temporary strippable protective coating on a metallic surface selected from the group consisting of an aluminum surface and a ferro-metallic surface comprising a homogeneous admixture of from about 70 to 50 parts of paraffin wax and correspondingly from about 30 to 50 parts of an ethylene-

---

[1] The Myvacets are prepared by the action of acetic anhydride upon mixtures of monoglycerides from lard fat. The solid grades are described as waxy, flexible fats which retain plasticity when cooled to very low temperatures. Myvacet 5–00, the highest melting grade, is a distilled monoglyceride from hydrogenated lard in which about one half the free hydroxyl groups have been acetylated. Myvacet 5–00 has the following typical properties:

| | |
|---|---|
| Melting point, ° F. | 106–109 |
| Clear point, ° F. | 131 |
| Viscosity, cps. at 50° C. | 30 |
| Saponification No. | 296 |
| Percent monoglyceride | 14 | vinyl acetate copolymer having a vinyl acetate content between about 25 and 35% by weight, said admixture further containing from about 2 to 12% of homogeneously dispersed glyceryl monolaurate.

8. A composition as described in claim 2 wherein the release agent is a partial trihydric alcohol ester of a fatty acid having from 10 to 18 carbon atoms, said composition being especially adapted for the coating of ferro-metallic surfaces.

9. A composition as described in claim 3 wherein the release agent is a trihydric alcohol monoester of a fatty acid having from 10 to 18 carbon atoms, said composition being especially adapted for the coating of ferro-metallic surfaces.

10. A composition as described in claim 4 wherein the release agent is a glyceryl monoester of a fatty acid having from 10 to 18 carbon atoms, said composition being especially adapted for the coating of ferro-metallic surfaces.

References Cited by the Examiner

UNITED STATES PATENTS

| | | | |
|---|---|---|---|
| 2,142,039 | 12/38 | Abrams et al. | 260—28.5 |
| 2,462,331 | 2/49 | Myers | 260—23 |
| 2,485,248 | 10/49 | Watson et al. | 260—31.6 |
| 2,790,732 | 4/57 | McGarry et al. | 260—887 |
| 3,010,899 | 11/61 | Boyer | 260—33.6 |
| 3,146,214 | 8/64 | Jakaitis | 260—28.5 |

LEON J. BERCOVITZ, *Primary Examiner.*

DONALD E. CZAJA, *Examiner.*